Nov. 26, 1935.                F. NORTZ                2,022,253
              DRAFT GEAR FOR RAILWAY VEHICLES
                    Filed March 15, 1932
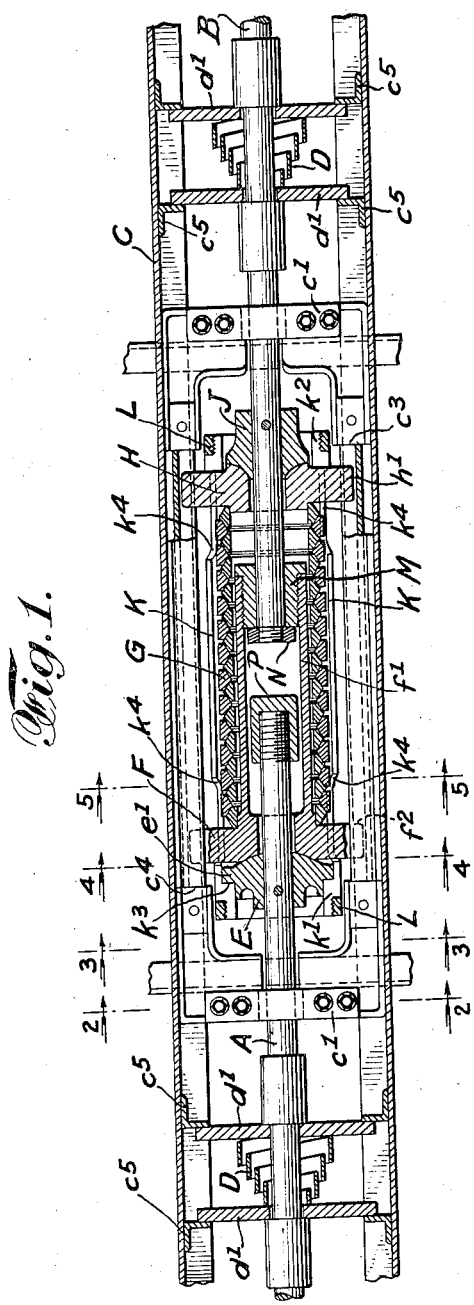
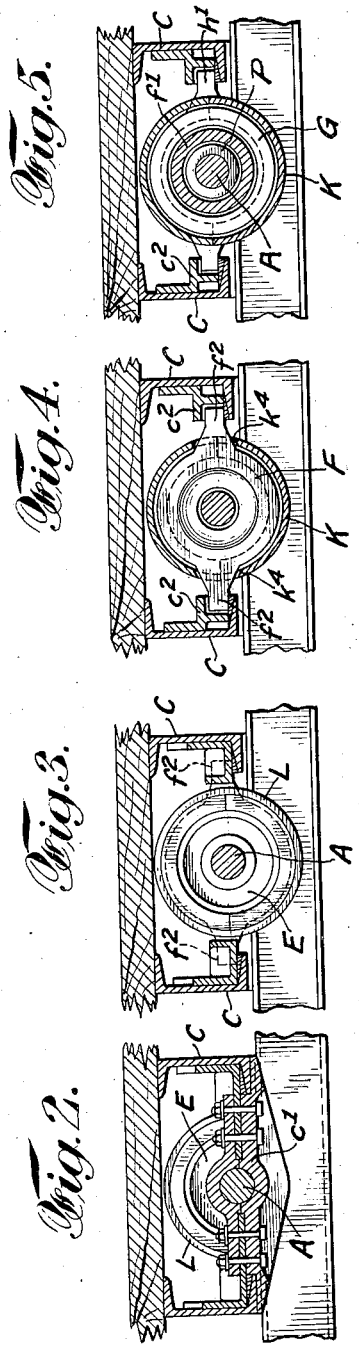
INVENTOR
Franz Nortz
BY Kenyon & Kenyon
ATTORNEYS Patented Nov. 26, 1935

2,022,253

UNITED STATES PATENT OFFICE 2,022,253

DRAFT GEAR FOR RAILWAY VEHICLES

Franz Nortz, Essen, Germany, assignor to Fried Krupp Aktiengesellschaft, Essen, Germany, a corporation of Germany Application March 15, 1932, Serial No. 598,915
In Germany March 27, 1931

9 Claims. (Cl. 213—8)

This invention relates to continuous draft gear for railway vehicles, wherein two draw and buffer bars are joined at their inner ends by a connector permitting limited relative movement of the rods toward or away from each other and such movement is opposed by resilient means which may also serve to communicate stresses to the vehicle. In such type gears, resilient means also are usually provided between the rods and the vehicle for transmitting stresses from the rods to the vehicle.

An object of this invention is a simple, compact and efficient arrangement of the connector and resilient means in such type of draft gear.

Other objects, novel features and advantages of this invention will be apparent from the following specification and accompanying drawing, wherein:

Fig. 1 is a longitudinal horizontal section through one embodiment of the invention, and Figs. 2 to 5 inclusive are vertical transverse sections taken substantially on the lines 2—2, 3—3, 4—4 and 5—5 of Fig. 1.

Two draw and buffer rods A and B are slidably mounted in bearings $c^1$ which are rigidly connected with the longitudinal members C forming part of the underframe of the vehicle. The rods A and B are provided with collars engaged by followers $d^1$ between each pair of which is arranged a spring D. The followers $d^1$ engage abutments $c^5$ on the members C and through this arrangement of abutments, followers, springs and collars stresses may be resiliently transmitted from the rods A and B to the vehicle.

The collar E is secured to the rod A and engages the spring plate F having a tubular portion $f^1$ into which the end of the rod A projects, the spring plate F and the rod A being capable of relative movement. A spring G surrounds the part $f^1$ and has one end bearing against the plate F while the other end bears against a spring plate H slidably mounted on the rod B. The spring plate H engages a collar J secured to the rod B.

A two-part tube K surrounds the spring G and extends beyond the collar E and overlies the collar J, the parts being held together at their ends $k^1$ and $k^2$ by rings L. The end $k^1$ is provided with a shoulder $k^3$ which bears against the flange $e^1$ of the collar E. Slots $k^4$ are provided through which extend lugs $f^2$ and $h^1$ of the spring plates F and H, these lugs projecting into grooves formed by the members C and guide rails $c^2$ secured thereto. Abutments $c^3$ and $c^4$ are provided on the members C to be engaged by the lugs $f^2$ and $h^1$ to limit the movement of the plates F and H relative to the vehicle.

A collar M is slidably arranged on the inner end of the rod B and is held on the rod by the nut N. The collar M is exteriorly threaded and is screwed into the interiorly threaded end of the tubular portion $f'$. A nut or collar P is threaded on to the inner end of the rod A. The spring plate F and its tubular portion $f'$, together with the collar M and the nuts P and N constitute a connector for the rods A and B which permits limited relative movement toward or away from each other of the two rods, such relative movement of the two rods being resiliently opposed by the spring G.

Outward pull on the two rods results in resilient transmission of stresses between them by way of the collar E, tube K, spring plate H, spring G, spring plate F, tubular member $f'$, collar M and nut N and in case the pull applied exceeds the strength of the spring sufficiently to bring the nut P into engagement with the spring plate F, the stresses are transmitted rigidly by way of the nut P, spring plate F, tubular portion $f'$ and collar M and nut N. Inward push on the two rods results in resilient transmission of stresses between the two rods by way of the collar E, spring plate F, spring G, spring plate H and collar J and if the inward push exceeds the resistance of the spring G sufficiently to bring the nuts P and N into engagement, then the stresses are transmitted rigidly from one rod to the other.

Inward push on the rod A alone results in bringing the lugs $h^1$ of the plate H into engagement with the abutments $c^3$ so that the buffing force is transmitted resiliently to the vehicle by way of the collar E, spring plate F, spring G, spring plate H, lugs $h^1$ and abutments $c^3$. Similarly, upon outward pull on the rod A only the lugs $f^2$ of the plate F will engage the abutments $c^4$ and the pulling force will be resiliently transmitted to the vehicle by way of the collar E, tube K, spring plate H, spring G and spring plate F. An outward pull on the rod B moves the collar M to the right and with it the tubular portion $f^1$ and the spring G. The spring G moves to the right without compression and carries with it the spring plate H until the latter engages the abutments $c^3$. During the initial movement of the rod B, only the right hand spring D is brought into play, but after the spring plate H engages the abutments $c^3$, then the spring G is compressed, thereby resiliently transmitting stress to the vehicle. Inward push on the rod B causes the collar J to move the spring plate H, together with the spring G and the plate F, until the latter strikes the abutment $c^4$ without the compression of the spring G. Simultaneously, the rod A is moved to the left by virtue of contact between the collar E and spring plate F, the collar E being rigid with the rod A. During the initial movement of the rod B, only the springs D are brought into play, but after the spring plate F engages the abutments $c^4$, further inward movement of the rod B effects compression of the spring G to resiliently transmit force to the vehicle.

The arrangement of the spring G around the connector results in a compact and highly efficient structure and also effectively prevents buckling of this spring. The arrangement of the tube K provides means for transmitting buffing or draft stresses resiliently to the car vehicle when such buffing or draft stresses are applied to only one of the draft rods.

It is of course understood that various modifications may be made in the above described structure, without in any way departing from the spirit of the invention as defined in the appended claims.

I claim:

1. In combination with a car frame, a pair of rods extending substantially the full length of the car frame, a connector joining together the inner ends of said rods for limited relative movement toward and away from each other, a spring plate rigid with said connector, a second spring plate slidably mounted on one of said rods, a spring surrounding said connector and interposed between said plates, abutments fixed to said rods to engage said plates, and means for limiting movement of the plates away from each other.

2. In combination with a car frame, a pair of rods extending substantially the full length of the car frame, a connector joining together the inner ends of said rods for limited relative movement toward and away from each other, a spring plate rigid with said connector, a second spring plate slidably mounted on one of said rods, a spring surrounding said connector and interposed between said plates, abutments fixed to said rods to engage said plates, means for limiting movement of the plates away from each other, lugs carried by said plates, and abutments on said frame engageable by said lugs to limit movement of said plates relative to the vehicle.

3. In combination with a car frame, a pair of rods extending substantially the full length of the car frame, a connector joining together the inner ends of said rods for limited relative movement toward and away from each other, a spring plate rigid with said connector, a second spring plate slidably mounted on one of said rods, a spring surrounding said connector and interposed between said plates, abutments fixed to said rods to engage said plates, and a sleeve surrounding said spring and cooperating with said plates to limit movement of them away from each other.

4. In combination with a car frame, a pair of rods extending substantially the full length of the car frame, a connector joining together the inner ends of said rods for limited relative movement toward and away from each other, a spring plate rigid with said connector, a second spring plate slidably mounted on one of said rods, a spring surrounding said connector and interposed between said plates, abutments fixed to said rods to engage said plates, a sleeve surrounding said spring and having slots, and lugs on said spring plates extending through said slots and cooperating with the sleeve to limit movement of the spring plates away from each other.

5. In combination with a car frame, a pair of rods extending substantially the full length of the car frame, a connector joining together the inner ends of said rods for limited relative movement toward and away from each other, a spring plate rigid with said connector, a second spring plate slidably mounted on one of said rods, a spring surrounding said connector and interposed between said plates, abutments fixed to said rods to engage said plates, a sleeve surrounding said spring and having slots, lugs on said spring plates extending through said slots and cooperating with the sleeve to limit movement of the spring plates away from each other, and abutments on said frame engageable by said lugs to limit movement of the plates relative to the vehicle.

6. In combination with a car frame, a pair of rods extending substantially the full length of the car frame, an abutment on each of said rods, a spring plate slidably mounted on each rod for engagement with the corresponding abutment, a tubular extension from one of said spring plates into which projects the inner ends of both of said rods, means on the inner ends of said rods connecting the same to said tubular portion for limited relative movement of the rods toward and away from each other, a spring surrounding said tubular portion and interposed between said spring plates, and means for limiting movement of the plates away from each other.

7. In combination with a car frame, a pair of rods extending substantially the full length of the car frame, an abutment on each of said rods, a spring plate slidably mounted on each rod for engagement with the corresponding abutment, a tubular extension from one of said spring plates into which projects the inner ends of both of said rods, means on the inner ends of said rods connecting the same to said tubular portion for limited relative movement of the rods toward and away from each other, a spring surrounding said tubular portion and interposed between said spring plates, a sleeve surrounding said spring and limiting the movement apart of said spring plates.

8. In combination with a car frame, a pair of rods extending substantially the full length of the car frame, an abutment on each of said rods, a spring plate slidably mounted on each rod for engagement with the corresponding abutment, a tubular extension from one of said spring plates into which projects the inner ends of both of said rods, means on the inner ends of said rods connecting the same to said tubular portion for limited relative movement of the rods toward and away from each other, a spring surrounding said tubular portion and interposed between said spring plates, and a sleeve surrounding said spring and spring plates, said sleeve having slots, lugs on said spring plates extending through said slots and cooperating with said sleeve to limit movement apart of the spring plates.

9. In combination with a car frame, a pair of rods extending substantially the full length of the car frame, an abutment on each of said rods, a spring plate slidably mounted on each rod for engagement with the corresponding abutment, a tubular extension from one of said spring plates into which projects the inner ends of both of said rods, means on the inner ends of said rods connecting the same to said tubular portion for limited relative movement of the rods toward and away from each other, a spring surrounding said tubular portion and interposed between said spring plates, a sleeve surrounding said spring and spring plates, said sleeve having slots, lugs on said spring plates extending through said slots and cooperating with said sleeve to limit movement apart of the spring plates, and abutments on the frame engageable by said lugs to limit movement of the spring plates relative to the vehicle.

FRANZ NORTZ.